Jan. 14, 1969   G. W. WILLIAMS, JR   3,421,371
SHAFT SPEED AND ANGULAR POSITION INDICATING SYSTEM
Filed July 15, 1966                               Sheet 1 of 7

INVENTOR
GERALD W. WILLIAMS, JR.
BY
ATTORNEY

United States Patent Office 3,421,371
Patented Jan. 14, 1969

3,421,371
SHAFT SPEED AND ANGULAR POSITION
INDICATING SYSTEM
Gerald W. Williams, Jr., 6060 N. 21st Drive,
Phoenix, Ariz. 85015
Filed July 15, 1966, Ser. No. 565,501
U.S. Cl. 73—189  20 Claims
Int. Cl. G01w 1/02; H01g 5/01

ABSTRACT OF THE DISCLOSURE

An apparatus, circuits and method for indicating shaft speed and angular position especially adaptable to provide wind speed and direction readings which utilizes an original power source of pulsed characteristic, a phase shift component connected to the power source and having a rotatable element joined to the shaft, whereby a phase shifted signal is derived. Counter components or other means are used for indicating the frequency or total of coincident peaked power pulses from said original power and phase shifted signals to provide a reading of shaft speed. A timing circuit is provided in the shaft angular position components for determining a time-space value separating the peaked power pulses of said original power and phase shifted signals to provide a reading of shaft angular position.

---

Particularly, the invention is concerned with the provision of a single type of instrument head assembly which may be used to obtain readings for wind direction or wind speed depending on the particular type of wind gauge affixed thereto. Readings of either quantity may be obtained from identical head assemblies by changes in the type of wind gauge exposed to the elements and by further changes in the electronic readout circuit associated with the particular head assembly. In use of the device it is contemplated that separate units will be mounted for exposure to the wind with a first unit being provided with anemometer cups and with a second unit being provided with a weather vane for the indication of wind speed and direction, respectively.

While mechanisms similar to the intended head assembly have previously been used for indication of azimuth readings or directions, it is believed that the associated circuits presented herewith present improvements in even such direction indicating mechanisms. The use of the same type of head assembly for the indication of wind speeds has required the development of a new and novel associated electronic circuit providing a total system which is intended to satisfy the following guide objectives.

A primary object is to provide wind speed and direction indicators of improved reliability, accuracy and economy.

A further object of the invention is to provide indicators and associated circuits which may be located at remote stations to provide dependable readings that may be transmitted by radio or land lines to a central data collection center.

Another object of the invention is to provide wind indicators in which structural components of the wind speed and the wind direction assemblies are identical.

A further object of the invention is to provide a wind indicator system incorporating novel electronic readout components whereby the wind data collected may be transmitted, displayed, or collated at the pickup station or at remote data centers.

Another object of this invention is to use the phase-shift characteristics of a multi-segment condenser to indicate wind or shaft rotary speeds or wind or shaft angular dispositions.

Further objects and advantages of the present invention will be apparent from the appended description and drawings, in which.

Briefly stated, the present invention provides electronic circuits capable of receiving the output from a phase-shift condenser head assembly to provide either a reading of wind direction or of wind speed. In the wind speed components the shaft of the phase-shift condenser is rotated by anemometer cups, and the rotation of the shaft causes a dielectric disc to be rotated between condenser plates. The output of such condenser is shifted in phase with relation to the positioning and rotation of the dielectric disc. The phase-shifted output is amplified and shaped to provide a pulse signal in a displaced electrical position corresponding to the extent of phase-shift. This pulsed signal is recombined with a standard or regulated phase pulse in a gated summer component which is biased to pass a combined pulse only at the instant in time when the phase-shifted pulse coincides with the regulated pulse to provide a combined pulse of increased amplitude. The combined pulses only are transmitted to a counter mechanism where the number of combined pulses counted in a prescribed time period is related to the speed of rotation of the dielectric disc and, therefore, to the wind speed rotating the anemometer cups. In the wind direction components the degree of phase-shift resulting from the differential positioning of the head assembly is indicative of the wind direction in a manner similar to some previous utilizations of this type head assembly. As an improvement thereover, however, additional electronic circuits are provided so that the direction of the wind can be presented as a numerical readout of the compass position of such wind direction. Additional features of the invention will become apparent from the accompanying drawings and the following explanation.

Figure 1:
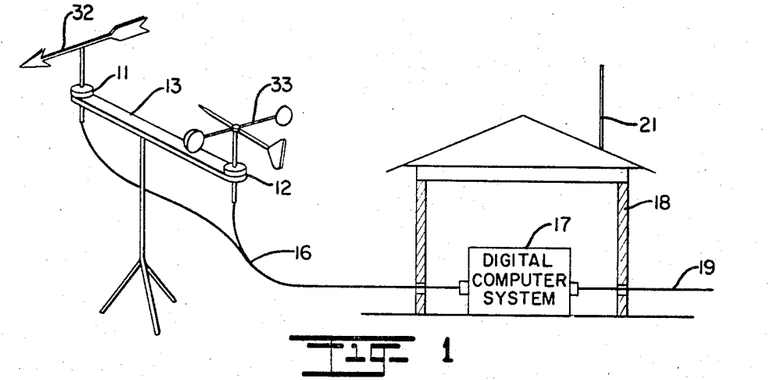
FIG. 1 is a diagram showing a type of remote station installation.

FIG. 1 illustrates an on-site installation of the necessary wind indicators and associated electronic equipment. The mechanisms and equipment can be installed at remote locations where the wind direction head assembly 11 and the wind speed head assembly 12 may be disposed on a single mounting arm 13 or at dispersed positions. An input line 16 interconnects the head assemblies and the electronic circuits disposed at the remote station as indicated by the readout components 17 within the shelter 18. Power will be provided to such electronic components and the head assemblies by a conventional power line or by a remote site generator (not shown). When energized, readout information will be available from the separate head assemblies, and this information as modified by the electronic circuits can either be provided for direct visual display at the shelter or station or it can be transmitted by use of land lines 19 or by radio transmitting and receiving equipment and antenna 21 to a central collection center for display, storage or retransmission. Since all of the mechanisms and circuits used have a high reliability, the stations may be left unattended at remote sites. At the remote stations only periodic visits by maintenance personnel will be required.

This maintenance free reliability factor, which is in large measure dependent upon the simplicity of construction of the head assemblies, makes it possible for more weather stations to be established in either populated or remote locations. Due to a lower cost of installation and maintenance, this type of weather readout equipment could be used at a plurality of remote stations to increase the reliability of background weather data so that more accurate and precise forecasts could be made.

The fact that the system here presented can provide a visual digital or analog readout at the respective stations that is of such nature that it can be easily transmitted to a central data collection center for similar display represents an improvement over most previous systems. Accordingly, while the electronic circuits described herewith do not represent the only possible means for utilizing, gathering or displaying information from the weather head assemblies, it is believed that the specilc circuits and especially the overall arrangement of components and the step processes accomplished by such components present a useful and novel improvement that could well be worthy of both conjoint and separate presentation.

Figure 2:
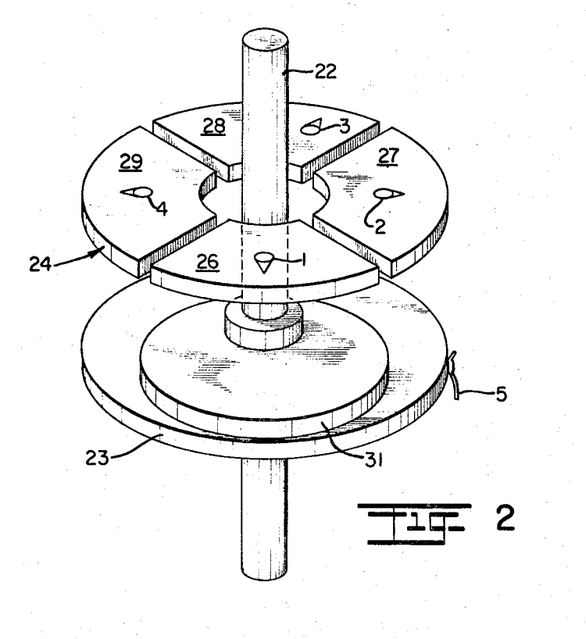
FIG. 2 is a perspective drawing showing details of a pickup head assembly.

For the purposes of the present description, the construction features of the head assemblies may be first described. The head assemblies to be used in connection with this presentation are shown in FIG. 2. Here it is shown that the vertically mounted rotor shaft 22 extends between the spaced apart plates 23 and 24 of a condenser apparatus. As illustrated, the upper plate 24 is divided into a plurality of segments, while the lower plate 23 is of a circular shape surrounding the rotor shaft but insulated therefrom. The upper plate is divided into a plurality of input sectors 26, 27, 28 and 29. The rotor shaft 22 may be connected to a weather vane 32 or to an anemometer cup mechanism 33 so that the shaft 22 will rotate with such members. When the shaft rotates, a dielectric rotor or disc 31 will be rotated in position between the condenser plates 23 and 24. An electric signal or voltage is introduced to the separate segments or input sectors of the plate 24. The potential between such segments and the output plate 23 will obviously be varied when the dielectric rotor 31 is rotated to various angular positions between the condenser plates. If separate input signals are connected to the individual sectors of the plate 24 and if such signals present potentials of varying amplitude, it is known that the output of the condenser will have a phase-shifted relationship to the input signals.

This phase-shifting capability with the described type of apparatus is used alternately in the present design to indicate the rotary speed of the shaft 22 or the angular position of the shaft 22 to provide a readout of the wind speed or wind direction, respectively.

A full discussion of the phase-shift properties of this type of head assembly is presented in chapter 9 of vol. 17 of the Radiation Laboratory Series, under an article entitled "Special Variable Condensers," beginning at page 288 of Components Handbook, edited by J. F. Blackburn. In this reference detailed construction features of a Western Electric condenser and of a Nilsen condenser are presented together with mathematical analysis of the phase-shift characteristics of such condensers. The article discloses the construction and operational features of either 3-segment or 4-segment condenser plates and for structures in which the dielectric rotor is either of circular or cardioid disc configuration. In the present description a 4-segment plate is illustrated together with a circular dielectric rotor disc. It should be understood, however, that a different number of sectors may be used and that a rotary disc of circular, cardioid, or other modified shape may likewise be used with any particular segmental plate configuration so long as the shape and spacing of said rotors and segments is compatible to provide a desired phase-shift relationship between input and output signals. It should further be realized that the illustration presented in FIG. 2 is in part diagramatical, inasmuch as some structural components necessary to hold the condenser plates, rotor shaft and rotor disc in properly aligned position have been omitted. In connection with such omissions it need only be presented that the discs of the condenser should be held in close parallel relation to avoid distortion of the output signal while the thickness of the rotor of dielectric material and the air space between the rotor and the respective plates of the condenser are likewise closely regulated. Some of the desirable construction features for this type of phase-shift condensers to provide a weather and dust tight structure are likewise shown and presented in the reference material.

Even with close observation of such details of construction, however, it should be noted that a head assembly including these features of construction can be provided economically. The mechanical parts utilized are few in number and of simplified design when compared to other weather vane and anemometer drive systems which use closely matching parts, gears, balance springs and the like. In addition to the simplicity of construction of the illustrated head assemblies, an important inherent advantage of the present system is embodied in the fact that the same structural parts may be used in the head assembly for the wind direction instrument as well as for the wind velocity instrument. This duplication of parts in the separate head assemblies simplifies manufacturing, installation and maintenance procedures to the considerable advantage of users of the present equipment.

Inasmuch as this type of head assembly has previously been used for the determination of azimuth or rotor shaft headings and positions (see the reference cited), a description of the wind speed mechanism and electronic readout is believed to be of first importance. The elements operative in the derivation of a desirable wind speed readout are shown in block diagram in FIG. 3. Here the initial input to the system is from a crystal oscillator labeled as Block 2. The output of the crystal stabilized oscillator is a 10 kc. wave form which is delivered to Block 3, the components of which are shown in FIG. 4. These components include a cathode follower coupled circuit inclusive of tube V1, which is itself coupled to a negative feed-back amplifier inclusive of tubes V2 and V3. The output of V3 is transformer coupled by means of the transformer T1 to center tap transformers T2 and T3. As shown in FIG. 4, the transformers T2 and T3 can actually be disposed at the head assembly 12 or closely adjacent thereto on the mounting arm 13. With such arrangement a 1000 ohm line would interconnect the feed-back amplifiers located in shelter 18 and the transformers at the head assembles. Ths arrangement would eliminate the necessity for having the multiple output leads from transformers T2 and T3 extend all the way from the protected shelter to wind speed head assembly 12. At the head assembly 12 the lines 1, 2, 3 and 4 from transformers T2 and T3 will be connected to the separate segments 26, 27, 28 and 29 by the number connectors 1, 2, 3 and 4 (see FIG. 2). The phase-shifted output signal from the lower condenser plate 23 will be connected to Block 5.

With this circuit arrangement the input to each of the segments 26–29 will be a 10 kc. wave form with a 90 degree phase-shift existing between each of the segments due to the connection and operation of transformers T2 and T3 as shown. With the input of separately phase-shifted signals the output from the plate 23 will itself be a combined phase-shifted signal in which the angle of output phase-shift will be dependent upon the particular position of the dielectric rotor as the signal is transmitted. For all mechanical angular positions of the dielectric rotor disc there is a corresponding linear related electronic phase-shift for the output signal.

Figure 3:
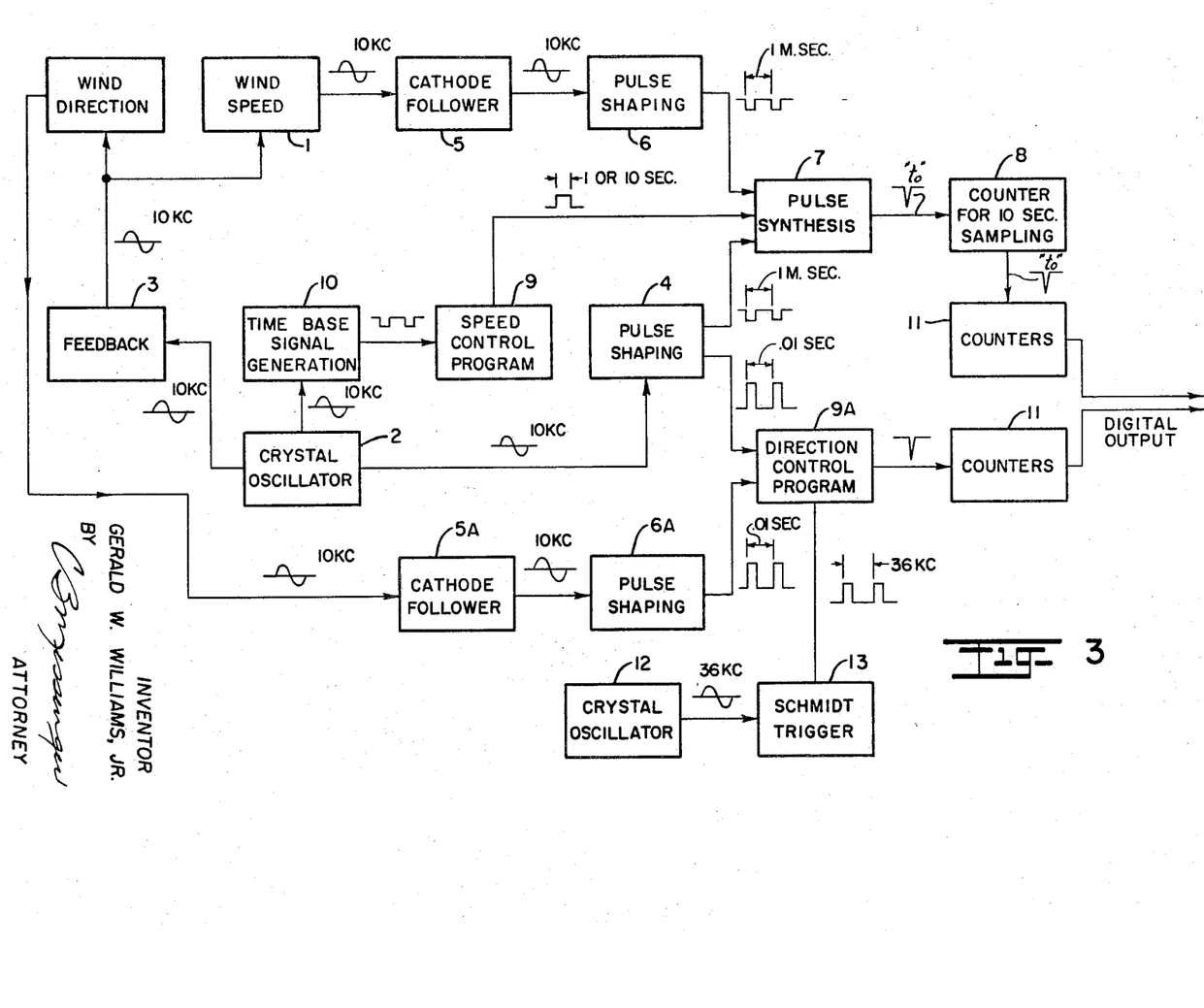
FIG. 3 is a block circuit diagram of a preferred form of a combined wind speed and wind direction apparatus.
Figure 4:
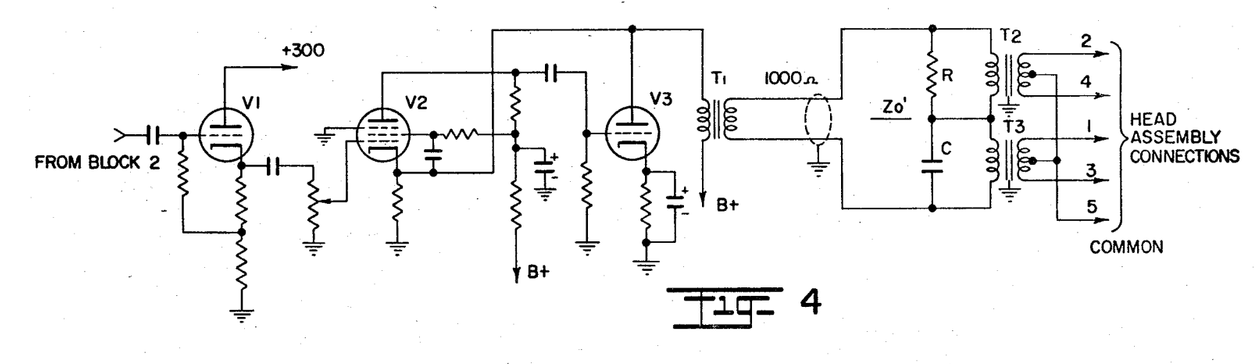
FIG. 4 is a proposed circuit for a feed-back amplifier and wind speed head assembly feed circuit (Block 3)
Figure 5:
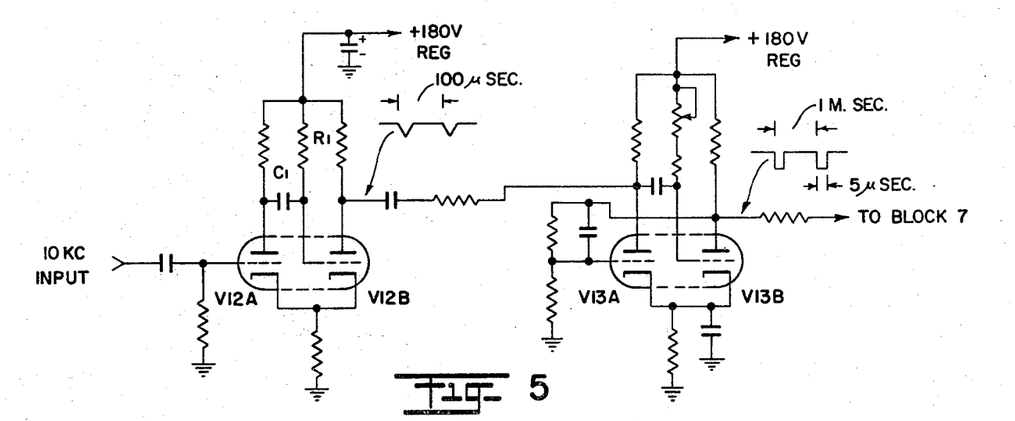
FIG. 5 is a circuit diagram for a pulse shaping component (Block 6)

As indicated in the block diagram in FIG. 3, the output from the wind speed head will be a phase-shifted 10 kc. wave form which will itself be introduced to a cathode follower negative feed-back amplifier at Block 5 for amplification and subsequent introduction to a pulse shaping circuit in Block 6. At this component the amplified phase-shifted sign wave is converted to a rectangular wave shape in a pulse clipping circuit before being coupled to a $\frac{1}{10}$ frequency divider. A representative circuit for this block installation and for Block 4 is shown in FIG. 5. In this circut multi-unit tube V12A–V12B is coupled in a RC circuit to provide the desired pulse clipping and differentiation before introduction into the pulse forming and $\frac{1}{10}$ frequency divided network of tube V13A–V13B. The output of this multi-vibrator circuit in which the grid resistor of V13B is set to divide the frequency by ten is a square wave pulse of one millisecond period in which the pulse form is of approximately five microsecond duration.

Figure 6:
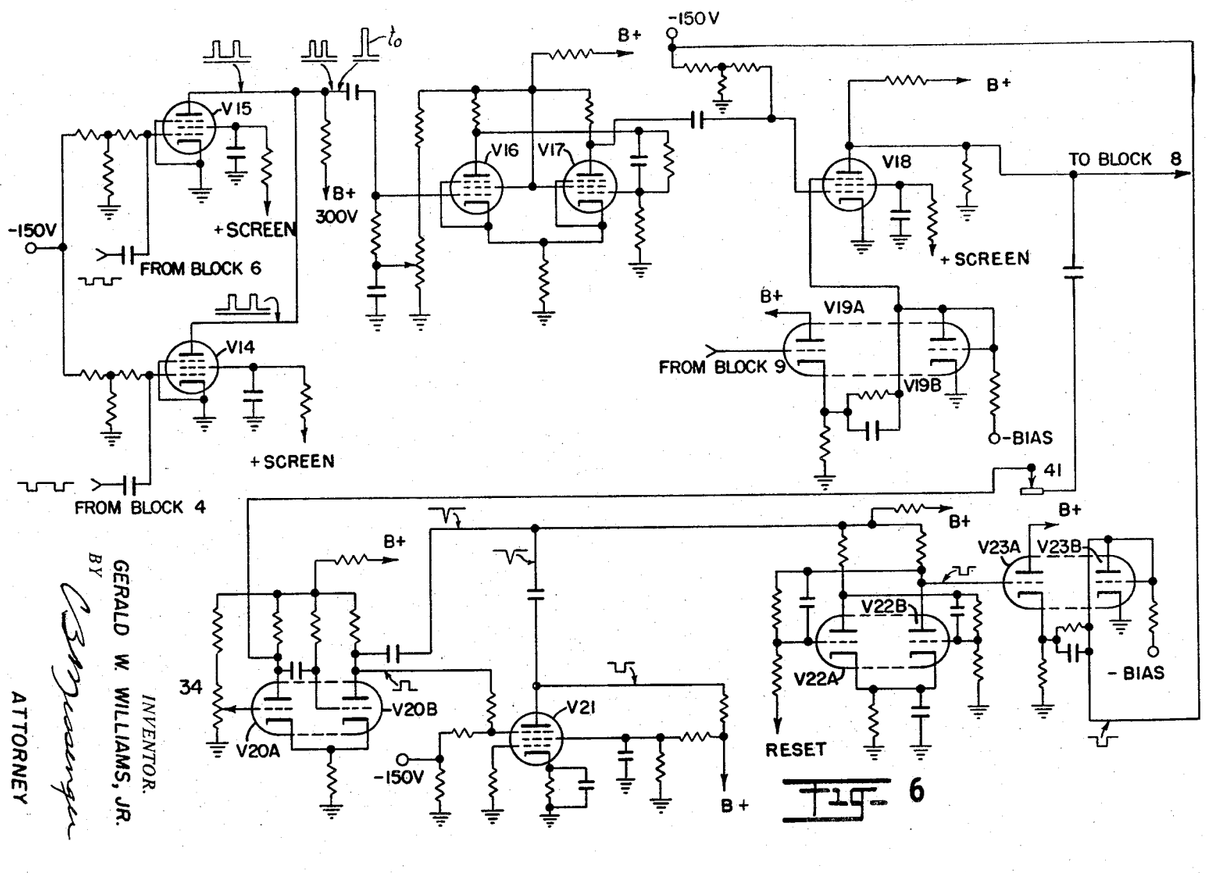
FIG. 6 is a preferred arrangement for a gated summer and signal blanking circuit (Block 7), FIGS. 7 and 7A combined present a circuit diagram for a speed control program (Block 9)

The output of Block 6 is connected into Block 7 which includes gated summer and Schmitt discriminator combined circuits. Detailed construction features of a typical circuit is shown in FIG. 6. Before explanation of such circuit, however, it should be noted that two additional input signals are provided at Block 7. A first input signal is obtained from the pulse shaping network of Block 4 which may be of design identical with that of Block 6. With this pulse shaping circuit of Block 4 likewise being connected to the crystal oscillator (Block 2), a wave form similar to that derived from Block 6 can be obtained but these separate signals will be in phase-shifted relationship one to the other due to the displacement of the signal that has passed through the phase-shift condenser of the head assembly 12 as represented by Block 1. The remaining signal interconnected into the summer circuit at Block 7 includes a time limiting signal from the speed control program components of Block 9. This time limiting signal which can either be of one or ten second duration is provided to limit the pulse sampling or counting period for the apparatus so that accurate wind speed readings may be provided for winds in both the low speed range, such as up to 4 miles per hour, and the high speed range from 4 miles per hour to over 100 miles per hour. The desired time limit for the wind velocity then being sampled is determined by the speed control program apparatus of Block 9, which automatically activates relays for either a 1 second or 10 second program depending on the total number of pulses that have been counted in a previous sampling period. For instance, if less than 4 pulses have been counted (which could correspond to 4 revolutions of the anemometer shaft or to 4 miles per hour wind velocity), the apparatus can be shifted to a 10 second count. This 10 second count will be maintained until more than 40 pulses have been counted in the sampling period. If more than 40 pulses have been counted, the wind velocity will be more than 4 miles per hour. Accordingly, to maintain a proper accuracy of signal, a 1 second program will be instituted. Whether in the 1 second or 10 second program, the output from the speed control program apparatus will determine the full period during which a sampling count is made by the counters 8 or 11. If the apparatus is in a 10 second program, the count will be made by the counter 8, and the readout can provide a reading in miles and tenths of mile per hour. When the apparatus is in the 1 second program, a direct readout will be provided by the counter 11 which will read in miles per hour.

The function of Block 7 is to combine the pulses from Blocks 4 and 6 in such manner that these pulses are imposed on a single circuit and will be additive one with the other at any time that the phase-shifted signal passing through Block 6 corresponds in time relation to the unshifted signal derived from Block 4. When these two signals occur simultaneously, the amplitude of the combined signal will be adequate to pass the discriminator circuits of Block 7 for transmission to the counter circuits. In other words, the function of this component is to pass a pulse signal to be counted only when the phase-shifted signal from the wind speed head 12 is synchronized with the unshifted signal from Block 4. In general, this synchronization of the pulses will happen only once for each revolution of the dielectric rotor in head assembly 12. For the circuit described and illustrated the rotor could be operated at a speed up to 24,000 r.p.m. without creation of more than one phase synchronized pulse per r.p.m. For lower rotative speeds of the rotor 24, it is quite possible that unwanted pulses could be introduced, and, accordingly, it is desirable to switch to a 10 second sample for wind speeds which rotate the shaft at less than 4 r.p.m. For the longer sampling time a greater total number of pulses will be passed by the gated summer of Block 7, and, accordingly, the counter represented by Block 8 which provides for a readout in tenths will be used during the 10 second program. A single counter could be used if proper means were provided for displacement of the decimal in the readout circuits. Such 10 to 1 scale reduction could, of course, be provided by mechanical or electronic means or by direct interpolation of the readout presentation.

Whether operating on a 1 second or 10 second program and whether the counter of Block 8 or Block 11 is being used, the pulses which will be counted are only those pulses which have been received simultaneously in the gated summer of Block 7 in such manner that the amplitudes of the separate pulses are additive and, accordingly, of sufficient intensity to be passed on to the counters. All non-simultaneous pulse combinations will be discarded. In order to relate the number and frequency of pulses being passed to the rotative speed of the wind speed head assembly 12, a control must be established to determine the period of time through which pulses will be passed to the counters for tabulation. The speed control program of Block 9 is used for this purpose.

A circuit which will serve the gated summer and discriminator purposes of Block 7 is shown in FIG. 6. Here the tubes V14 and V15 are gated summers, inasmuch as gating is applied to their control grids. With the wave shapes from Block 6 and from Block 4 applied to the control grids of V15 and V14, respectively, and with the establishment of a −150 volts bias, negative going 5 microsecond pulses introduced to the control grids of these tubes will cause V14 and V15 to be cut off.

As illustrated, both V14 and V15 have a common plate load resistor, and only at a time "$t_0$" when the control grid pulses are in phase will the combined output pulse from V14 and V15 be sufficient to drive the Schmitt discriminator circuits of V16 and V17. In such Schmitt discriminator circuit, V17 is normally conducting, and V16 is normally cut off. When the input pulse from the gated summers is equal to or greater than the difference in potential for the grids of V16 and V17, "flipping" action occurs, and a positive pulse is presented at the plate of V17 until the input pulse decays, when the discriminator will again change state.

An optimum pulse shape is presented to gated tube V18 due to hysteresis effects. Tube V18 itself amplifies such input signal, and the output of this tube is delivered to the counters of Blocks 8 and 11 where the amplified highly peaked signal at time "$t_0$" will be easily accepted to operate the circuits of conventional counter type equipment. As will be noted in FIG. 6, further inputs may be introduced to the tube V18. An input from multi-unit tube V19A–19B, which is itself connected to an output signal from Block 9 (see multi-unit tube V32A–V32B), provides positive gating to the suppressor grid of V18 so that V18 will be operable during sampling periods and disabled during display periods for the counters.

It should also be noted that the output from V18 is connected through relay contacts 41 (which will be closed during the 10 second program operations of the unit) to V20A–20B in such manner that a spike pulse from V18 causes V20 to change states and to remain in the changed state for a time interval $(t-t')$ that can be determined or changed by the adjustable grid resistor 34 of V20A. At time "$t$" when V20 changes state, a positive gate is applied to V21, which is normally cut off. V21 then conducts, and a differentiated negative pulse from the plate of V21 is applied to V22A–22B causing multi-unit V22 to change states. At time "$t$" the gating of V22B is delivered by way of V23A–23B to the control grid of V18 causing it to be cut off. At time "$t'$" V20A–20B changes state automatically to cut off V21 and causes V22A–22B to change states again to restore positive gating to V22B and, through V23A–23B, to V18, so that V18 will again react to input pulses from the Schmitt discriminator.

This blanking of V18 after each pulse input for a time interval $(t'-t)$ is important to the operation of the circuits of the present device when the unit is in the 10 second program, inasmuch as it provides only the desired combined amplitude output signal which may be counted to obtain the desired wind speed reading instead of providing an excessive number of pulses and erroneous readings.

Figure 7:
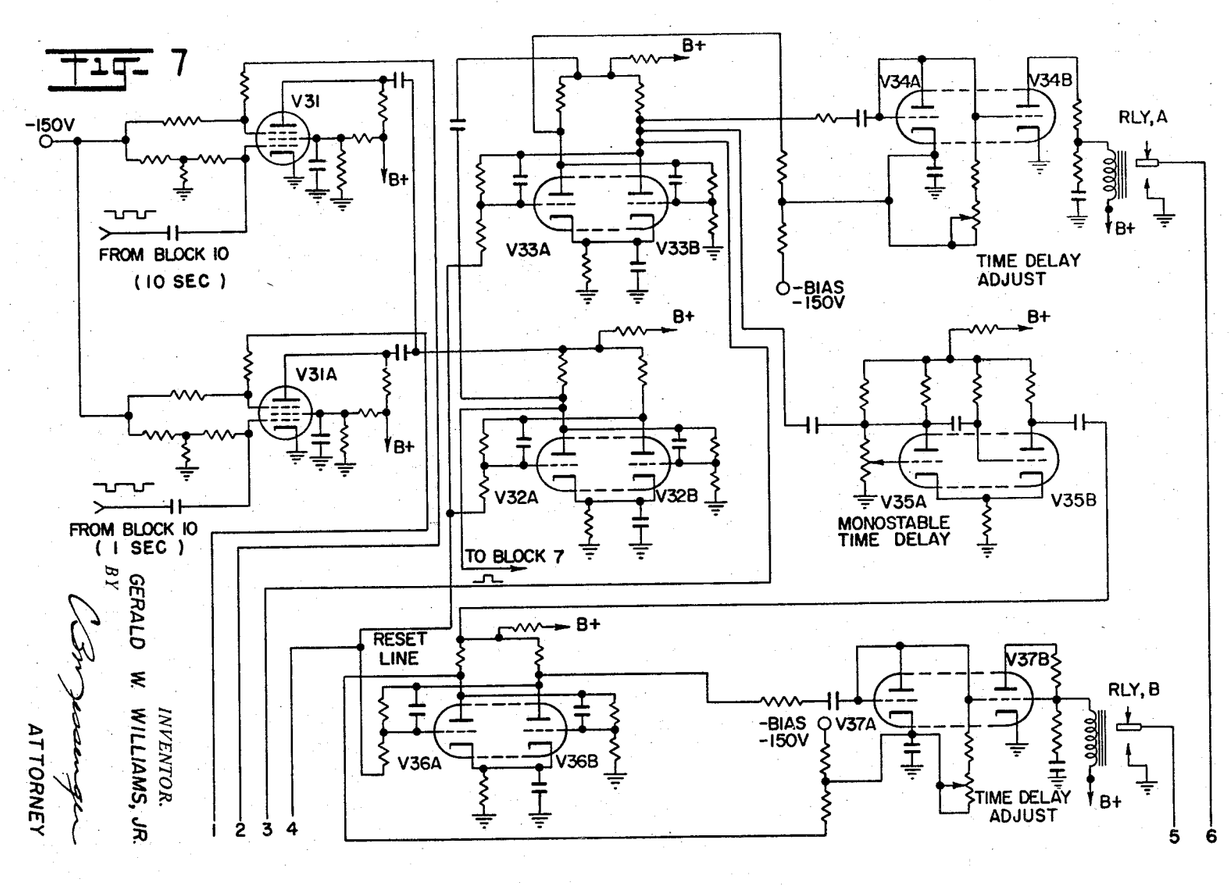

Whether in the 1 second or 10 second program, the output pulses from V18 as regulated by the circuit connected through the contacts 41 in the 10 second program must still be introduced to the counters at only selected intervals of time. The proper interval selection is regulated by the speed control program of Block 9 as shown in FIG. 7.

As shown in FIG. 3, the speed control program (Block 9) equipment is connected through time base signal generation components (Block 10) to the stabilized crystal oscillator of Block 2. Such crystal oscillator likewise supplies the control signal for the pulse shaping circuit of Block 4, which is similar to that of Block 6, and also provides the time-standard 1 kc. pulse with which the phase-shifted pulses from Block 6 are recombined in the gated summer of Block 7.

The function of the sped control program is to time a 1 second or 10 second program so that a proper reading will be derived from the Block 7 gated summer. It is also desirable in such component to provide means for determining whether the 1 second or 10 second program should be used in accordance with the then existing wind conditions. The actual timing of a one second or 10 second period can be accomplished in many different ways, and there are even various ways for determining which time program should be applied to make the proper readings. Some of the timing circuits now used in frequency meters or in radar applications will be applicable to the present requirements. Even mechanical switching would be possible, though electronic switching and relay systems are preferred. The components for determining the existing wind speed and, accordingly, for establishing the proper time period can likewise be of various designs and constructions, inclusive of mechanical, electrical or electronic means. Where the type of electronic time delay gate circuits illustrated in FIG. 6 are to be used to establish in a blanking interval, it is perhaps desirable that the control which predetermines the application of a 1 second or 10 second program should likewise be electronic. The circuit for accomplishment of these desirable results is shown in FIGS. 7 and 7A.

Figure 7A:
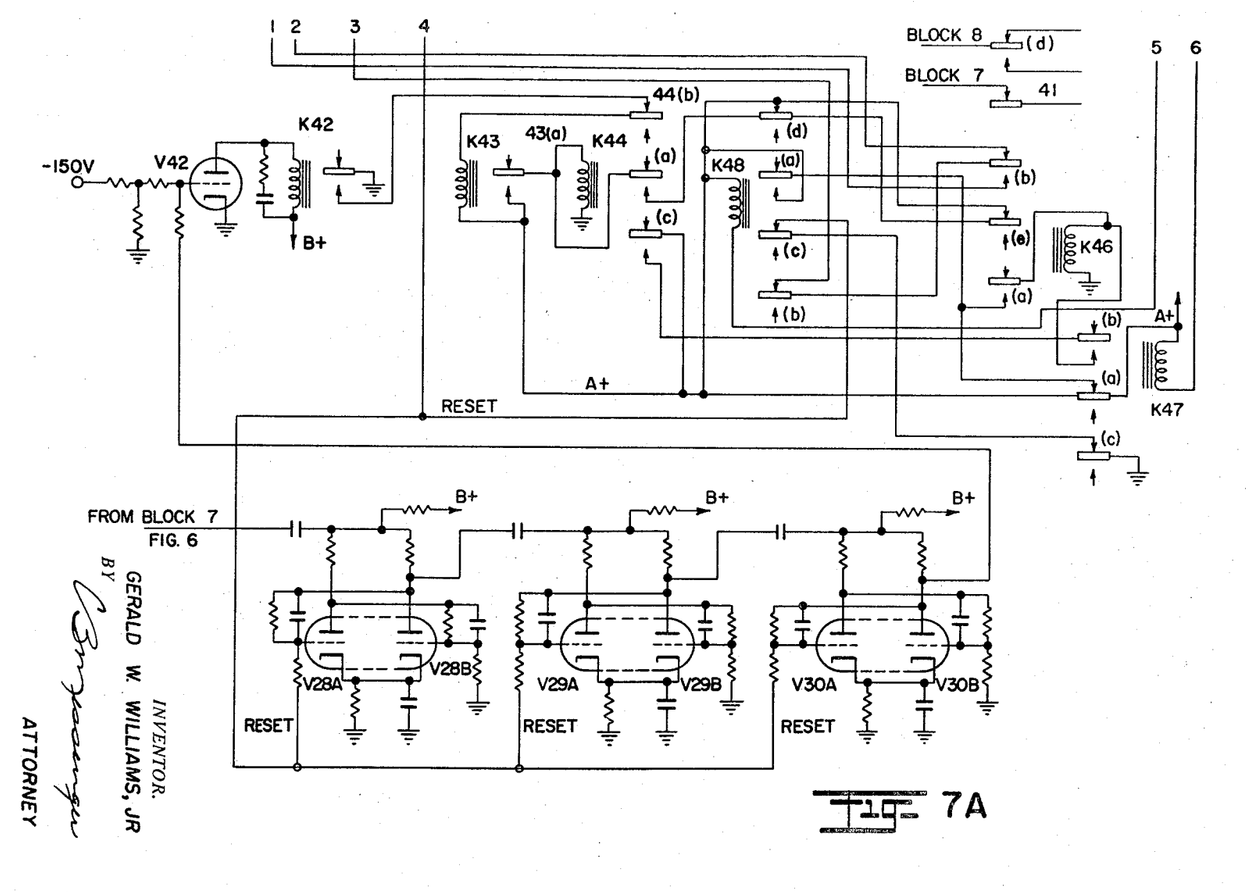
Figure 8:
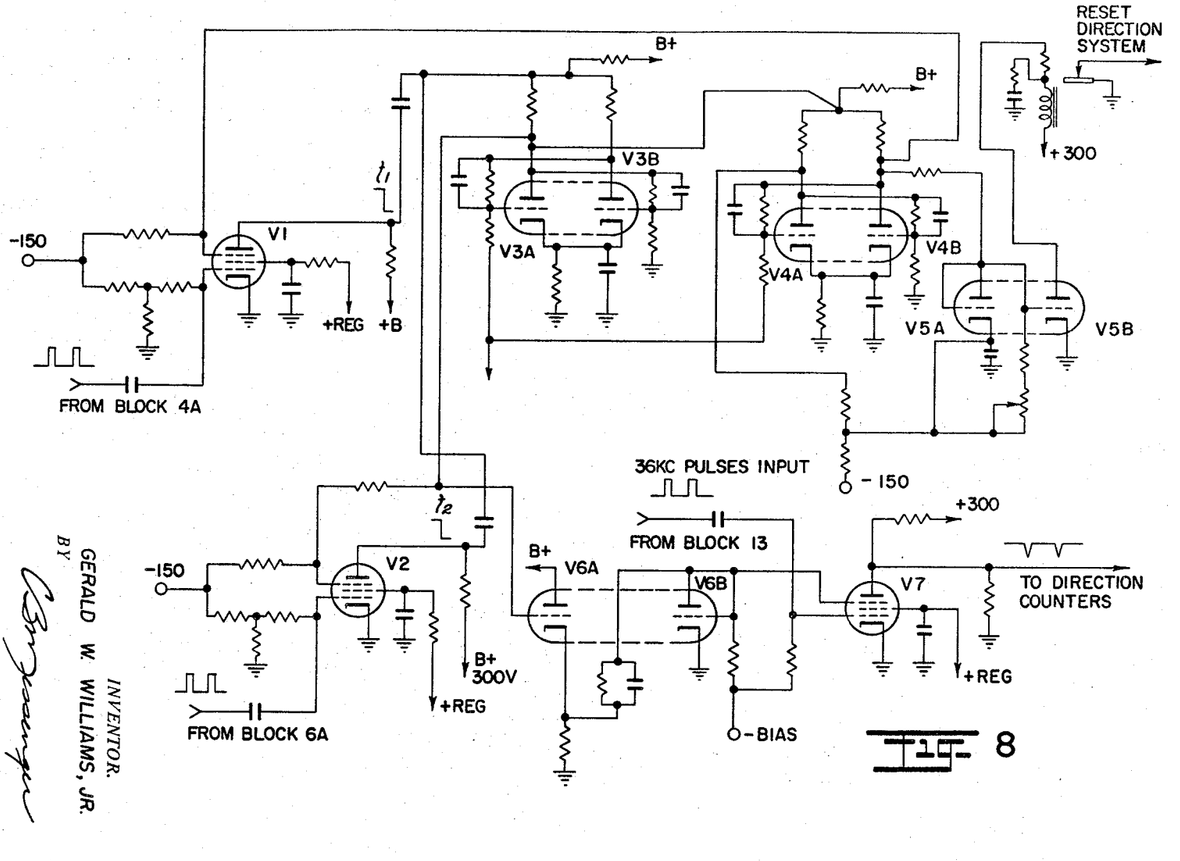
FIG. 8 is a circuit used in the wind direction readout components of the invention.

In FIG. 7A the multi-unit tubes V28, V29 and V30 are binary scalers in which V28A, V29A and V30A are normally non-conducting. These binary scalers as illustrated are connected so that if four input pulses are received from Block 7, a signal or trigger input will be delivered to the grid of V42 causing relay K42 in the plate circuit of V42 to be activated. On activation of relay K42, relay K43 will be activated through the contacts 44(b) of relay K44. However, relay K44 is also energized by the contacts 43(a) of relay 43. When relay K44 energizes, contacts 44(b) break, and relay K43 is disabled. Relay K44, however, will continue to be locked ON or energized by its relay contacts 44(a). This condition will be maintained at any time that four counts or more have been applied to the binary scalers V28, V29 and V30.

As previously indicated, if more than four counts or pulses are obtained, it is desirable that Block 9 be operated to provide a one second count. The entire system of Block 9, however, is set up so that on initial activation of the system a 10 second count will be used. This is established, since relay K46 is normally not activated when initial operations begin. With relay K46 inactive, relay A in the plate circuit of V34B of multi-unit tube V34 (see FIG. 7) will be closed at the beginning of a DISPLAY interval to activate relay K47 closing contacts (b) thereof and energizing relay K46 from the contacts (c) of relay K44 if a count of four or more pulses pass the binary scalers V28, V29 and V30. Assuming that this is the case, relay K46 will be energized. (On the closing of contacts K44(c), A-plus voltage is presented at contact K47(b), and the armature coil of K46 is energized.)

At the end of a time delay period established by multi-unit tube V35, relay B in the plate circuit of V37B will be closed. This will activate relay K48. On the activation of relay K48, relay K46 will be locked ON by contacts K48(a) and K46(a). When the time delay of V34 is completed, relay A will open, and relay K47 will be de-energized to break the contacts K47 (b) at the same time the contacts K47(a) are closed. This shunts contacts K48(a). Relay K46, however, is still locked ON, since relay K48 is still energized. However, at the completion of DISPLAY (at the beginning of SAMPLE), K-48 is deactivated, and the system is reset by the contacts K48(c) and K47(c). Relay K46 remains locked ON by contacts K46(a) and contacts K47(a). Consequently, the one second SAMPLE proceeds. Contacts K46(b) are made, and the suppresser bias for V31A is supplied by V33B through contacts K48(b) and contacts K46(b). Further, it should be noted that when relay K48 was energized, the memory of relay K44 was unlocked, since relay K46 was also energized. This happens since contacts K46(e) are broken when relay K46 is energized and when contacts K48(d) are broken. Relay K44 is deactivated and cannot be restarted until K43 is again energized by the relay action of K42.

So long as four pulses or more are received by V28, V29 or V30, one second sampling will take place. (K44's memory is still unlocked each cycle, so long as it has "memorized" at least four pulses during each sampling period.) On the other hand, if four counts or more are not received by V28 during a sampling period, K46 will be deenergized when K47 is energized, and it will remain deenergized since contacts K44(c) are open. Under these conditions a ten second sample will take place in the next SAMPLE period.

While the circuits now described direct the one second or ten second sampling, the remaining circuits of FIG. 7 provide means for establishing the count that will be transmitted to the counters to indicate the wind speeds. In these circuits V31 and V31A are adjusted so that if a positive going pulse arrives at their control grids, they will conduct. If this happens at a time $t_1$, then a negative spike will be developed across the coupling capacitors to V32, and V32 will change states creating a time base signal at the plate of V32A. This will continue for a time base interval $(t_3-t_1)$. At time $t_3$ V32 again changes state, but this time a negative going pulse is coupled from the plate V32A to V33A, so that V33 changes state. This in turn removes suppressor gating from V31A, and the high plate voltage of V33A overcomes the bias on grid V34B causing relay A to conduct. As described previously, relay A actuates K47 and opens the grids of V32A and V33A returning them to normal operation. Relay A also activates a "reset" in the counters in Block 11 and in Block 8 and further actuates relays in the counters to start a counting readout. This readout may be delivered to a visual display or may be used to operate a teletype or other system for transmitting the derived wind speed index. Simultaneously, the R-C combination in the control grid of V34A will now be discharged. The time it takes this R-C combination to discharge corresponds to the time that relay A and relay K47 will remain energized. However, relay K48 will be energized before relay K47 is de-energized, and this will keep positive gating from V33B from being reapplied to V31 or V31A by way of the contacts on relay K46 until relay K48 is de-energized so that sampling can begin again.

It should be remembered that at time $t_3$ a negative spike output from the plate of V33B was applied to monostable time delay circuits of V35. At the end of the time period established by V35, V36 will be activated to change state, and V36 and V37 will then operate in the same manner as previously described for V33 and V34 to activate relay B. On the activation of relay B, relay K48 will be energized.

The circuits of Block 4 can be used further in connection with the wind direction head by the addition of a further frequency divider circuit so that a separate output pulse of 100 cycles per second may be derived. This additional circuit will provide control pulses having a period of 1/100 second which is fed to the direction control program of Block 9A, together with a phase-shifted signal of similar period obtained from the wind direction head 13, the cathode follower amplifier of Block 5A and the pulse shaping circuit of Block 6A. Again, the circuits of Block 6A are similar to the circuits of Block 6 with the exception of an additional frequency divider to provide a 1/100 second control period.

The direction control program (Block 9A) further has an input from a 36 kc crystal oscillator (Block 12) and the Schmitt trigger pulse shaping circuits of Block 13. With this arrangement a counting sequence initiated by a signal from Block 4 will be terminated by a phase-shifted signal from Block 6A. With such arrangement the number of pulses emitted by the 36 kc. crystal oscillator during the control period of the count will be directly related to the angular position of the phase-shifting dielectric rotor in the wind direction head 13. In other words, the maximum number of counts that can be passed to the counters 11 for digital or other output would be 360, and this count will only be obtained when the phase-shift condenser has displaced the 10 kc. wave form zero degrees or a full 360 degrees. Under such conditions, the count will continue for a full 1/100 second. With any intermediate displacement of the phase-shift rotor and signal, the count will be interrupted by the phase-shifted pulse from Block 6A after the expiration of less than 1/100 second and the indicated wind direction count will be less than 360. For all such intermediate positionings of the wind direction head, the readout will directly correspond to the angular position of the head away from a predetermined reference point.

The fact that the same head assembly can be used for the indication of either wind speed or wind direction or that these same assemblies could be used for the indication of rotor shaft position or rotor shaft speed constitutes a special advantage of the present invention. Many other features are adaptable for use with mechanisms other than wind indicators. The mechanisms and circuits are directly usable for determining shaft speeds and angular positions. The entire system illustrated is also adaptable to the use of transistor elements and circuits in place of the vacuum tube circuits shown. Whether vacuum tube or solid state circuitry is used, it is intended that such developments are to be a part of this invention. Likewise, the several components and assemblies of the present invention and the described combination itself should be adaptable to various modifications and changes.

While the use of capacitors to obtain the required phase-shifted signal has been illustrated and described, it will be obvious to those skilled in the art that inductance circuits are likewise usable. A coil or other inductance phase-shift unit rotating in a magnetic field as provided by crossed coils or other inductance elements will give a similar phase-shifted signal that could be utilized with other features of the invention. Essentially then, a part of the invention is concerned with the determination of shaft speeds or angular positions utilizing a reference signal and a time or phase-shifted signal derived from or related to such reference signal in combination with other electronic circuitry for evaluating the timed relationship between the phase-shifted signals. Whether these relationships are established by gated summer or coincidence approaches or by other electronic, electrostatic or electromagnetic circuits providing a readout based on changes in the total or partial capacitance, inductance or resistance or on combinations thereof, it is believed that the novelty of the present invention should be recognized insofar as any such approach is embodied in the hereunto appended claims.

I claim:

1. In a system for indicating shaft speeds or angular positions, common components and circuitry useful for the separate functions inclusive of an alternating current power source having a characteristic cyclic power pattern, circuits connected to said power source for separating said power source output into time spaced components in separate circuit lines, each component retaining distinguishing power pattern characteristics, a multi-segment phase-shift condenser in said circuit with each input plate segment coupled to one of said separate lines to receive a separate time spaced component of said power input, an output plate for said condenser completing with said input plate segments a unit of said condenser, a dielectric disk interposed between said input and output condenser plates as a second unit of said condenser, means interconnecting one unit of said condenser and said shaft for conjoint rotation, said dielectric disk being of patterned shape and having an area less than the area of the otherwise directly opposed input and output plates whereby the signal received at the output plate will have been in part modified by the interposition of the dielectric disk to provide a recombined but phase-shifted signal at said output plate, amplifier and pulse shaping circuits connected to said output plate to provide a peaked pulse in time position corresponding to the phase-shifted signal on said output plate, associated circuits providing a peaked pulse output in time spaced position corresponding with the characteristic cyclic pattern of the said original power source signal, means additively recombining said pulsed signals, and counter components for receiving said combined pulsed signals to provide a readout indicating shaft speed or angular position.

2. Structure as set forth in claim 1 and further inclusive of a plurality of multi-segment phase-shift condensers with one of said condensers being used in a shaft speed indicating component of said system and another of said condensers being used in a shaft angular position indicating component of said system.

3. Structure as set forth in claim 1 inclusive of an anemometer on said shaft for the indication of wind speed.

4. Structure as set forth in claim 1 inclusive of a weather vane on said shaft for the indication of wind direction.

5. Structure as set forth in claim 2 wherein an anemometer is connected to one unit of one of said condensers and wherein a weather vane is connected to a unit of another of said condensers.

6. Structure as set forth in claim 2 wherein an anemometer is connected to the dielectric disk of one of said condensers and wherein a weather vane is connected to the dielectric disk of another of said condensers.

7. A system as set forth in claim 6 inclusive of an anemometer on said shaft for the indication of wind speed.

8. Structure as set forth in claim 7 wherein the anemometer and shaft are connected to said dielectric disk.

9. A shaft speed indicating mechanism and associated readout circuits comprising a power source having a characteristic cyclic power pattern, circuits connected to said power source for separating said power source output into time spaced components in separate circuit lines, each component retaining distinguishing power pattern characteristics, a multi-segment phase-shift condenser in said circuit with each input plate segment coupled to one of said separate lines to receive a separate time spaced component of said power input, an output plate for said condenser completing with said input plate segments a unit of said condenser, a dielectric disk interposed between said input and output condenser plates as a second unit of said condenser, means interconnecting one unit of said condenser and said shaft for associated rotation, said dielectric disk being of patterned shape and having an area less than the area of the otherwise directly opposed input and output plates whereby the signal received at the output plate will have been in part modified by the interposition of the dielectric disk to provide a recombined but phase-shifted signal at said output plate, amplifier and pulse shaping circuits connected to said output plate to provide a peaked pulse in time position corresponding to the phase-shifted signal on said output plate, associated circuits providing a peaked pulse output in time spaced position corresponding with the characteristic cyclic pattern of the said original power source signal, summer circuits connected to and receiving said peaked pulse signals and gated to pass a signal only when the peaked pulse of said original power source signal and the peaked pulse of said phase-shifted signal are coincident in time, and counter components connected to said summer circuit output to provide a readout of said summed pulses to indicate shaft speed.

10. A system as set forth in claim 9 and further inclusive of a time period regulating circuit interposed to activate and deactivate said readout components whereby the counter readout of summed pulses will be taken only during a regulated time interval.

11. A system as set forth in claim 10 wherein said time period regulating circuit comprises a speed control program element for automatically selecting and utilizing one of a plurality of pre-established time intervals.

12. A system as set forth in claim 11 and further inclusive of separate counter circuits for use with the separate time intervals of said speed control program element.

13. A shaft angular position indicating mechanism and associated readout circuits comprising an alternating current power source having a characteristic cyclic power pattern, circuits connected to said power source for separating said power source output into time spaced components in separate circuit lines, each component retaining distinguishing power pattern characteristics, a multi-segment phase-shift condenser in said circuit with each input plate segment coupled to one of said separate lines to receive a separate time spaced component of said power input, an output plate for said condenser completing with said input plate segments a unit of said condenser, a dielectric disk interposed between said input and output condenser plates as a second unit of said condenser, means interconnecting one unit of said condenser and said shaft for conjoint rotation, said dielectric disk being of patterned shape and having an area less than the area of the otherwise directly opposed input and output plates whereby the signal received at the output plate will have been in part modified by the interposition of the dielectric disk to provide a recombined but phase-shifted signal at said output plate, amplifier and pulse shaping circuits connected to said output plate to provide a peaked pulse in time position corresponding to the phase-shifted signal on said output plate, associated circuit providing a peaked pulse output in time spaced position corresponding with the characteristic cyclic pattern of the said original power source signal, a second power source connected in the circuits for said peaked pulse outputs and having a characteristic cyclic power pattern of a higher frequency than said first power source, and counter components interconnected to said peaked pulse and second power source outputs to provide a readout of total power pulses of said second power source, and a time period regulating circuit whereby the counter readout will be taken only during a regulated time interval, said time period regulating circuit being inclusive of trigger elements actviated and deactivated by the peaked pulse outputs of said original power source and the phase-shifted peaked pulse output signal derived from said output plate whereby the counter readout will continue only in the time interval between said peaked pulses.

14. A system as set forth in claim 13 inclusive of a weather vane on said shaft for the indication of wind direction.

15. Structure as set forth in claim 14 wherein the weather vane and shaft are connected to said dielectric disk.

16. A shaft speed and angular position indicating mechanism and associated readout circuits comprising an alternating current power source having a characteristic cyclic power pattern, circuits connected to said power source for separating said power source output into time spaced components in separate circuit lines, each component retaining distinguishing power pattern characteristics, a plurality of multi-segment phase-shift condensers, each of said condensers being incorporated in said circuit with the input plate segments of each condenser coupled to one of said separate lines to receive a separate time spaced component of said power input, an output plate for each condenser completing with said input plates a unit of said condensers, dielectric disks interposed between said input and output condenser plates as a second unit of each condenser, means interconnecting one unit of each condenser and a shaft for conjoint rotation, said dielectric disks being of patterned shape and having an area less than the area of the otherwise directly opposed input and output plates whereby the signal received at the output plates will have been in part modified by the interposition of the dielectric disks to provide recombined but phase-shifted signals, at said output plates, amplifier and pulse shaping circuits connected to said output plates to provide peaked pulses in time position corresponding to the phase-shifted signals on said output plates, associated circuits in said shaft speed mechanism providing a peaked pulse output in time spaced position corresponding with the characteristic cyclic pattern of the said original power source signal, summer circuits in said shaft speed mechanism connected to and receiving said peaked pulse signals and gated to pass a signal only when the peaked pulse of said original power source signal and the peaked pulse of said phase-shifted signal are coincident in time, counter components connected to said summer circuit output to provide a readout of said summed pulses to provide a shaft speed reading, a second power source connected in the shaft angular position circuits and having a characteristic cyclic power pattern of a higher frequency than said first power source, and counter components connected to said peaked pulse and second power source outputs to provide a readout of total power pulses of said second power source, and a time period regulating circuit whereby the counter readout will be taken only during a regulated time interval, said time period regulating circuit being inclusive of trigger elements activated and deactivated by the peaked pulse outputs of said original power source and the phase-shifted peaked pulse output signal derived from the output plate of said angular position mechanism whereby the counter readout will continue only in the time interval between said peaked pulses to provide a reading of shaft angular position.

17. A shaft speed indicating mechanism and associated circuits comprising a power source having an intermittent pulsed power pattern of a regular frequency greater than the expected rotational speed of said shaft, phase-shift apparatus connected to said power source, said apparatus being inclusive of at least two units with one unit establishing a force field and a second unit being disposed to intercept at least a portion of said force field, means connecting one of said units to said shaft for rotation whereby the output signal from said phase-shift apparatus provides a phase-shifted pulse in time spaced position with respect to the original input pulse with the degree of phase-shift being determined by the instantaneous shaft position at the time of pulse reception, summer circuits connected to and receiving pulse signals from said power source and phase-shift apparatus and gated to pass a signal only when the pulse of said original power source signal and the pulse of said phase-shifted signal are coincident in time, and shaft speed counter components connected to said summer circuit output to provide a readout of said summed pulses to indicate shaft speed.

18. Structure as set forth in claim 17 wherein said phase-shift apparatus includes units for changing the capacitance of said circuits.

19. Structure as set forth in claim 17 wherein said phase-shift apparatus includes units for changing the inductance in said circuits.

20. A shaft angular position indicating mechanism and associated circuits comprising a power source having an intermittent pulsed power pattern of a regular frequency, phase-shift apparatus connected to said power source, said apparatus being inclusive of at least two units with one unit establishing a force field and a second unit being disposed to intercept at least a portion of said force field, means connecting one of said units to said shaft for rotation whereby the output from said phase-shift apparatus provides a phase-shifted pulse in time spaced position with respect to the original input pulse with the degree of phase-shift being determined by the instantaneous shaft position at the time of pulse reception, means connected in said angular position mechanism circuits for producing a timing signal of a higher frequency than said power source pulses, counter means in said circuits to receive and count said timing signals, and means connected to said counter means utilizing said input and phase-shifted output pulses for initiating and terminating the count of said counter means whereby a time space evaluation of said phase-shifted pulse with respect to the said original input pulse is obtained to provide a reading related to the shaft angular position.

References Cited

UNITED STATES PATENTS

| 2,873,415 | 2/1959 | Nilsen | 317—253 |
| 2,923,861 | 2/1960 | Colt | 73—189 X |
| 3,068,692 | 12/1962 | Morgan | 73—189 |
| 3,264,554 | 8/1966 | Hayner et al. | 317—246 X |
| 3,276,256 | 10/1966 | Rudasill et al. | 73—189 X |
| 3,282,099 | 11/1966 | Kingman | 73—189 |
| 3,316,761 | 5/1967 | Frith et al. | 73—189 |

RICHARD C. QUEISSER, *Primary Examiner.*

J. W. MYRACLE, *Assistant Examiner.*

U.S. Cl. X.R.

317—253